United States Patent

Stahlecker

[11] Patent Number: 5,901,545
[45] Date of Patent: May 11, 1999

[54] SHAFT FOR AN OPEN-END SPINNING ROTOR AND METHOD OF MAKING SAME

[75] Inventor: Fritz Stahlecker, Josef-Neidhart-Strasse 18, 73337 Bad Überkingen, Germany

[73] Assignees: Fritz Stahlecker, Bad Ueberkingen; Hans Stahlecker, Suessen, both of Germany

[21] Appl. No.: 08/966,359

[22] Filed: Nov. 7, 1997

Related U.S. Application Data

[63] Continuation-in-part of application No. 08/708,414, Sep. 5, 1996, abandoned.

[30] Foreign Application Priority Data

Nov. 9, 1995 [DE] Germany .......................... 195 41 688

[51] Int. Cl.[6] .................................................. D01H 4/00
[52] U.S. Cl. ............................... 57/406; 57/404; 384/245
[58] Field of Search .............................. 57/406, 414, 415, 57/416, 417, 404; 384/610, 244, 245

[56] References Cited

U.S. PATENT DOCUMENTS

| | | |
|---|---|---|
| 2,048,708 | 7/1936 | Pfanstiehl ................................ 384/245 |
| 4,106,192 | 8/1978 | Stahlecker ................................ 308/172 |
| 4,856,918 | 8/1989 | Inoue et al. .......................... 384/245 X |
| 5,030,019 | 7/1991 | Stahlecker ................................ 384/610 |
| 5,212,999 | 5/1993 | Kitada .................................. 384/245 X |
| 5,261,221 | 11/1993 | Stahlecker et al. ....................... 57/406 |
| 5,349,809 | 9/1994 | Stahlecker ................................. 57/406 |
| 5,722,227 | 3/1998 | Stahlecker ................................. 57/406 |

FOREIGN PATENT DOCUMENTS 1901453 8/1970 Germany .

Primary Examiner—William Stryjewski
Attorney, Agent, or Firm—Evenson McKeown Edwards & Lenahan, PLLC

[57] ABSTRACT

In the case of a shaft for an open-end spinning rotor a supporting element is fixed in a concentric recess of the shaft. The supporting element is disposed with a radially extending supporting surface against a vibrating ball of a step bearing. A ball is used as a supporting element, a section of which ball projects out of the recess. The projecting section is radially flattened in relation to the shaft and thus forms the radially extending supporting surface. Because of its ball shape, the supporting element can be easily placed in the recess. In the case of a misaligned arrangement of the vibrating ball, the radial flattening prevents the axial position of the open-end spinning rotor from being displaced and undesirable radial forces being exerted on the shaft.

51 Claims, 2 Drawing Sheets

SHAFT FOR AN OPEN-END SPINNING ROTOR AND METHOD OF MAKING SAME

CROSS-REFERENCE TO RELATED APPLICATIONS

This application is a continuation-in-part of U.S. application Ser. No. 08/708,414 filed on Sep. 5, 1996, now abandoned.

BACKGROUND AND SUMMARY OF THE INVENTION

The present invention relates to a shaft for an open-end spinning rotor, the free end of which shaft comprises a supporting element which is arranged in a concentric recess of the shaft, said supporting element having an essentially radially extending supporting surface for a vibrating ball of a step bearing.

It is known (U.S. Pat. No. 5,349,809) that a cylindrical pin is used as a supporting element and is arranged in a concentric recess of the shaft. The pin has an essentially radially extending supporting surface, with which it is supported on a vibrating ball of the step bearing. When the pin is inserted into the recess, the air present there must be displaced. The pin is therefore provided in a first variation with longitudinal grooves, by means of which the displaced air can escape to the outside. In another variation, the recess adjoins an additional hollow space, in which the air displaced from the recess is compressed.

It is known (German published patent application 19 01 453) that a supporting element is used which has the shape of a hemisphere, a section of which projects from the front end of the shaft. The supporting element is supported on a stationary, essentially plane component of the step bearing.

The problems with the displacement of air can be avoided to a great extent when instead of a pin a ball is used as a supporting element. However, the use of a ball as a supporting element of a shaft can cause new problems in the case of step bearings which comprise a vibrating ball for the disposed shaft. If the axis of the shaft does not exactly align with the ball of the step bearing, it can lead to a displacement of the axial position of the open-end spinning rotor and to undesirable radial movements of the shaft, in particular to a radial migration. Even small deviations in tolerance in the manufacture of the step bearing are sufficient to bring this about.

In order to achieve faultless spinning results it is very important that the rotor cup attached to the shaft continuously takes up an exact, predetermined axial and radial position. When not exactly aligned, the center point of the vibrating ball is displaced relative to the axis of the shaft, so that the ball-shaped supporting element lies eccentric thereto. The position of the rotor cup is then displaced in the direction of the step bearing. This results in a change in the geometrical arrangement in the spinning area. The feeding of fibers into the rotor cup does not take place at the intended place, and the withdrawal nozzle is too far away from the rotor cup.

The change in the geometrical arrangement results in an increase in end-breaks and a worsening of yarn quality, in particular with respect to strength and evenness. In addition, the eccentric position of the ball-shaped supporting element effects an uneven axial and radial operation of the open-end spinning rotor. This also has a negative effect on the spinning results.

It is an object of the present invention to provide in the case of a shaft for an open-end spinning rotor an easily installed supporting element which does not adversely affect the predetermined axial and radial position of the open-end spinning rotor.

This object has been achieved in accordance with the present invention in that the supporting element is formed by a ball which projects out of the recess with a radially flattened section which contains the supporting surface.

A supporting element in the shape of a ball can be inserted into the shaft recess without any great difficulty. As, during insertion, the ball-shaped supporting element is disposed against the peripheral side of the recess with only a line extending in circumferential direction, the greater part of the air along the line can escape from the recess. With application of the usual tools for manufacturing the recess, it obtains a form such that the supporting element is not disposed against the entire peripheral surface of the recess, which leaves enough space for a possible compression of air.

Due to the radially extending supporting surface of the ball as a result of flattening, the contact surface, with which the supporting element touches the ball, extends also radially to the shaft. An axial displacement of the open-end spinning rotor is thus avoided. Also, radial forces at the step bearing, which could lead to undesirable migration and an uneven operation of the shaft, do not arise.

The supporting element can be arranged in the recess in different ways. The supporting element can, for example, be secured inside the recess by means of a suitable adhesive. Furthermore, it is also possible to use holding means which are effective from outside of the recess.

In an advantageous embodiment, the supporting element is made by removing material from the ball, for example by means of grinding. It is hereby advantageously possible to apply the supporting surface then when the supporting element has been inserted into the recess. It is also possible to insert the supporting element in its final form into the recess and for insertion to dispose it on its plane supporting surface.

The ball is made of a harder material than the vibrating ball and/or the shaft. The ball can be advantageously made of ceramic material.

In an advantageous embodiment, the recess has a stopping face for axially fixing the ball. It is hereby advantageous when the recess comprises a hollow conical section, whose peripheral surface forms the stopping face. Such a hollow conical section can be produced easily when the recess is manufactured using a drill.

In an advantageous way, the ball is held in the recess by means of a press fit.

In an advantageous embodiment the shaft is hardened at least in the area which borders the recess. Thus a widening of the shaft when pressing in the ball is avoided.

According to certain preferred advantageous embodiments, the supporting ball is received in a cylindrical bore of the shaft which has been extended by a bore with a smaller diameter. In this advantageous embodiment, the material which is removed from the ball is dimensioned so that the ball projects only approximately 0.4 mm beyond the end of the shaft. Also in this embodiment, the shaft is hardened to approximately 40 Rockwell hardness in the vicinity of the end of the shaft, which thereby prevents expansion of the shaft when the ball is pressed in and when the bore for accommodating the ball is produced.

In accordance with especially preferred embodiments of the method for manufacturing the rotor shaft assembly, the receiving bore for the supporting ball is drilled in the shaft after the shaft has been hardened.

According to advantageous features of preferred embodiments of the invention, the supporting surface of the ball projects with its supporting surface by an amount of no more than 1 mm beyond the end of the shaft. This ensures that the ball is largely protected during transportation and handling, so that alignment of the radial supporting surface of the ball is not altered inadvertently.

According to especially advantageous embodiments of the method of making the assembly, the ball is first placed in the bore and then fastened there, and thereafter the ball is machined to produce the supporting surface. Since the shaft and the ball form a unit before the supporting surface is produced, there is no problem to produce the supporting surface exactly radially to the shaft axis. In especially preferred embodiments, the supporting surface on the ball is formed following insertion of the ball in the receptacle of the shaft by grinding away the material of the ball. With the shaft being hardened, at least in the vicinity of the shaft end to a hardness of 40 Rockwell or more, the deformation that would otherwise be caused to the shaft when the ball is pressed in is limited.

Objects, advantages and novel features of the present invention will become apparent from the following detailed description of the invention when considered in conjunction with the accompanying drawings.

DETAILED DESCRIPTION OF THE DRAWINGS

Figure 1:
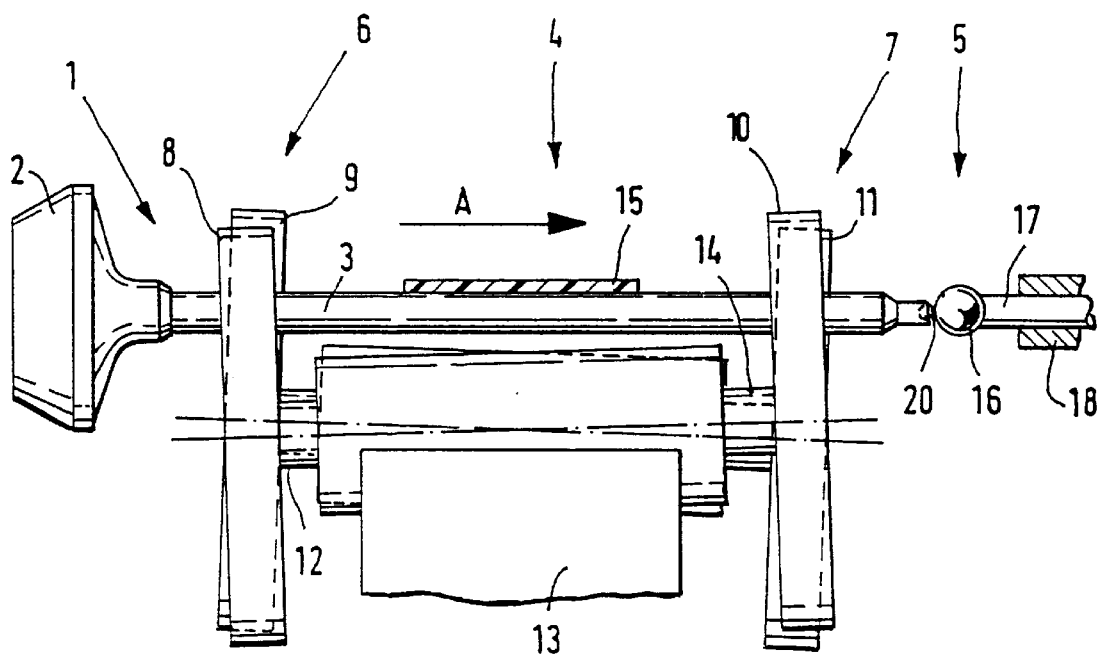
FIG. 1 is a side view of an open-end spinning rotor supported in a radial bearing and a step bearing, constructed according to a preferred embodiment of the invention.

The open-end spinning rotor 1 shown in FIG. 1 is a part of an open-end spinning arrangement (not shown). The spinning rotor 1 comprises a rotor cup 2 and a shaft 3, which is supported in a radial bearing 4 and a step bearing 5.

The radial bearing 4 comprises two supporting disc pairs 6 and 7 each with two supporting discs 8,9 and 10,11. The shaft 3 is radially supported in a known way in the wedge-shaped gaps (not shown) formed by the supporting disc pairs 6 and 7. The supporting discs 8,10 are arranged on an axle 12, which is supported on bearings, which in turn are supported by a bearing holder 13. In a corresponding way, the adjacent supporting discs 9,11 are arranged on an axle 14, which is supported in bearings, which in turn are supported by the bearing holder 13.

The shaft 3 supported in the wedge-shaped gaps of the supporting disc pairs 6 and 7 is driven by means of a tangential belt 15. The axle 12 of the supporting discs 8,10 and the axle 14 of the adjacent supporting discs 9,11 are arranged skewly inclined to each other in such a known way that the rotating shaft 3 is loaded with an axial force in arrow direction A. The shaft 3 is supported against a supporting ball 16 of the step bearing 5 by means of this axial force.

The supporting ball 16 is supported freely rotatable in a ball cup formed recess of an adjusting screw 17, which is arranged in a housing part 18 in an adjustable way. Because of machine vibrations, the supporting ball 16 is caused to carry out vibrations of low amplitudes and high frequency, whereby, due to varying supporting points, the supporting ball 16 rotates around a plurality of axes. The supporting ball 16 is continuously wetted by a lubricant (not shown).

The free end of the shaft 3 is provided with a supporting element 20, which is made of a ceramic material, preferably silicon nitride, and which has the shape of a ball 21.

Figure 2:
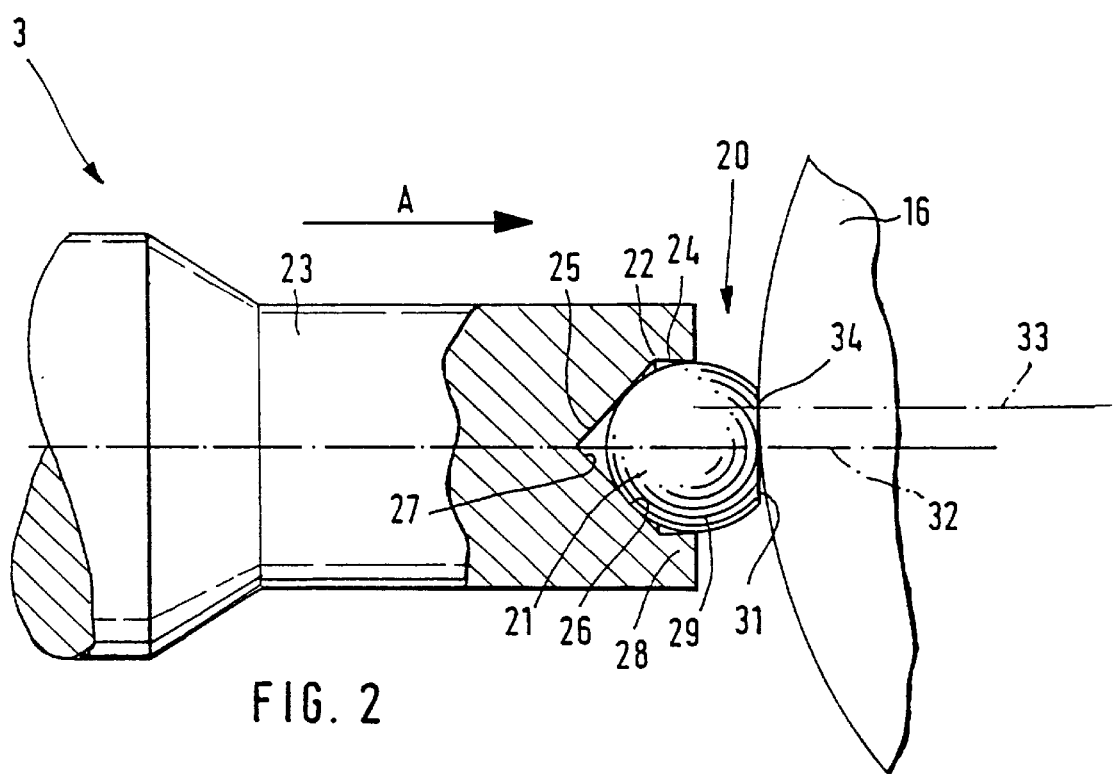
FIG. 2 is an enlarged partly cut view of the step bearing of FIG. 1.

As can be seen from FIG. 2, the ball 21 is held in a recess 22, which is arranged in an end section 23 of the shaft 3. The recess 22 is made as an axial bore hole and comprises a hollow cylindrical section 24 and an adjacent hollow conical section 25. The ball 21 is disposed inside the hollow conical section 25 against a stopping face 26, which lies on the inner circumferential surface 27 of the hollow conical section 25.

The area 28 of the steel shaft 3 bordering the recess 22 is hardened. The area 28 preferably comprises the entire end section 23, in which the shaft 3 has a reduced diameter.

The ball 21 projects with a section 29 out of the recess 22. The section 29 is flattened on the side facing the supporting ball 16 in radial direction of the shaft 3, so that in the flattened area an essentially plane supporting surface 31 is formed which extends radially in the direction towards the shaft 3. In the area between the edges of the supporting surface 31 and the recess 22, the section 29 is curved in a ball shape.

The inner diameter of the hollow cylindrical section 24 of the recess 22 is somewhat smaller than the diameter of the ball 21. When the ball 21 is inserted into the recess 22, it comes to rest against the circumferential surface 27 of the hollow conical section 25. The ball 21 touches the circumferential surface 27 on the stopping face 26 and is thus fixed in axial direction of the shaft 3. In addition, the ball 21 lies after insertion in the recess 22 fixedly against the circumferential surface of the hollow cylindrical section 24, so that a press fit is created. The hardened material of the shaft 3 in the area 28 prevents the recess 22 from widening when the ball 21 is being pressed in. The flattening of the supporting surface 31 takes place by means of grinding after the ball 21 has been pressed in.

As can be seen from FIG. 2, the shaft 3 is not exactly aligned to the supporting ball 16. The axis 32 of the shaft 3 is displaced slightly in relation to the center point 33 of the supporting ball 16 and thus also in relation to the axis 33 of the adjusting screw 17. The supporting ball 16 thus touches the ball 21 on a contact surface 34, which is disposed on the supporting surface 31 outside of the axis 32 of the shaft 3. The lateral deviation from the alignment amounts to preferably a few tenths of a millimeter and provides the supporting ball 16, which otherwise is driven only by machine vibrations, with an additional combined drive. As the contact surface 34 extends radially to the shaft 3, the shaft 3 is not radially displaced despite the eccentric arrangement. When the open-end spinning rotor 1 is rotating, the contact surface 34 can be disposed at any chosen point on the supporting surface 31 without undesired radial forces having an affect on the shaft 3. The axial position of the shaft 3 and of the rotor cup 2 affixed thereto remains the same, whether the supporting ball 16 is disposed eccentrically on the shaft 3 or not.

Figure 3:
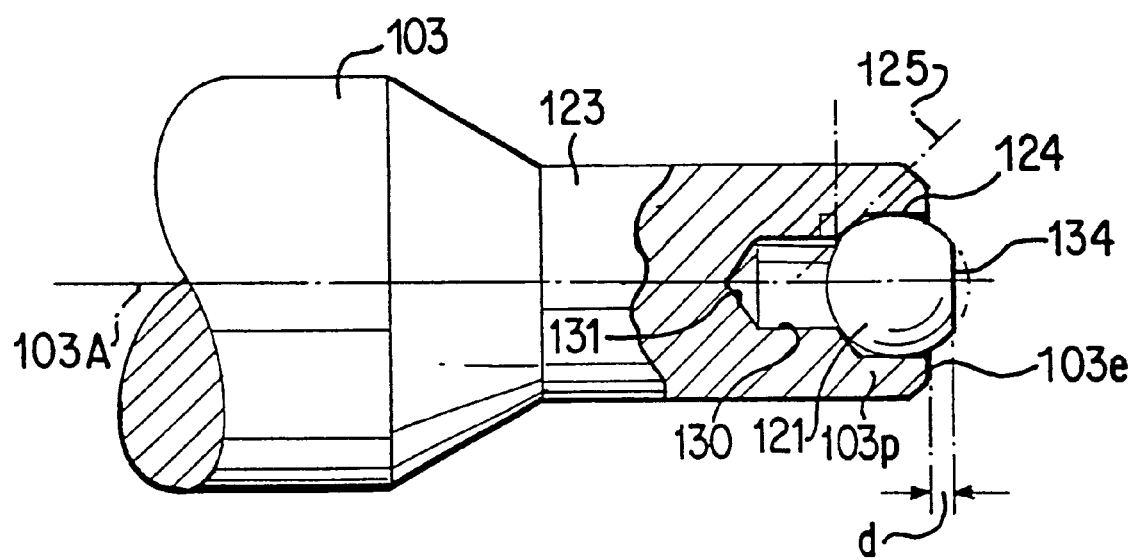
FIG. 3 is an enlarged partly sectional view of an alternative embodiment of the step bearing assembly including a smaller diameter extension of the cylindrical bore accommodating the ball.

FIG. 3 is a sectional view showing another preferred embodiment of the invention, wherein similar reference numerals, increased by 100, are used to depict similar structures as depicted in the embodiments of FIGS. 1 and 2, and accordingly are not further described except as set forth below.

The shaft 103 is provided at its end for accommodating the supporting ball 121 with a first cylindrical section 124 which has a diameter corresponding to the diameter of the ball 121 which is joined by a conical section 125, followed by a further smaller diameter cylindrical section 130, followed by a conical drill centering section 131. The conical section 125 extends at an angle of preferably 40° plus or minus 1° from the central axis 103A of the shaft 103. The supporting surface of the ball 121 is disposed at a distance d from the axial end 103e of the shaft by at most 1 mm, and preferably approximately 0.4 mm. Since the spacing of the supporting surface 134 on the ball 121 is a very small distance from the end 103 of the shaft 103, the assembled ball 121 and shaft 103 is protected by the surrounding portions 103p of the shaft 103 from being moved during transportation and handling of the assembly, thereby preventing inadvertent misalignment of the radial supporting surface 134 of the ball 121.

In especially preferred practical embodiments, the distance between the end 103e of the shaft and the end of the cylindrical section 130 is approximately twice the diameter of the ball 121. The diameter of the smaller cylindrical section 130 behind the ball 121 is about half the diameter of the ball 121 so that the conical supporting surfaces 125 and the cylindrical surfaces 124 provide a substantial contact surface for the ball 121 to be held in position in the shaft.

The assembly of FIG. 3 is manufactured as follows: First the shaft 103 is hardened at least in its reduced diameter end section 123 to a hardness of approximately 40 Rockwell. Subsequently, the cylindrical bores 130 and 124, along with the conical connecting surface 125, is formed by drilling with a precise centering of these cylindrical surfaces and conical surfaces with respect to the shaft axis 103A. Due to the hardening of the end section, this drilling process is carried out without any substantial undue expansion of the adjacent portions of the shaft end section 123. After the drilling operation, the ball 121 is pressed into and firmly fixed with the shaft 103A and pressed into the cylindrical bore against the cylindrical surfaces 124 and the conical surfaces 125, where it is thereby fixed in position with respect to the rotor shaft 103A. Subsequent to pressing in and fixing of the ball 121 in position, the supporting surface 134 is formed by removing material by grinding from the side of the ball extending beyond the shaft end.

Although the preferred embodiments illustrated and described above involve insertion of a ball into the cylindrical surface, with conical centering support surfaces, other supporting elements than a ball 121 are contemplated in conjunction with the method of manufacture described above.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of making a shaft assembly for an open-end spinning rotor, comprising:
   providing a spinning rotor shaft having a free end with a recess therein,
   placing a support ball into the recess,
   fixing said support ball to the shaft,
   and forming a plane supporting surface on the support ball for contacting a vibrating supporting ball of a step bearing when in an in use position on a rotor spinning machine.

2. A method according to claim 1, wherein said fixing includes press fitting said support ball into said recess.

3. A method according to claim 2, wherein said forming said plane supporting surface includes grinding said support ball after said press fitting.

4. A method according to claim 1, wherein said forming said plane supporting surface includes machining said support ball after placing of said support ball into the recess and fixing of said support ball to the shaft.

5. A method according to claim 1, wherein said plane surface extends radially with respect to an axis of said rotor shaft.

6. A method according to claim 5, comprising forming said plane surface by machining after placing said support ball into the recess.

7. A method according to claim 6, wherein said machining includes grinding the plane surface.

8. A method according to claim 1, wherein the recess comprises a stopping face for axially fixing the support ball.

9. A method according to claim 8, wherein the recess comprises a hollow conical section, whose circumferential surface forms the stopping face.

10. A method according to claim 9, wherein the support ball is held in the recess by a press fit.

11. A method according to claim 10, wherein the shaft is hardened at least in the area adjacent to the recess.

12. An open end spinning rotor support assembly comprising:
   a rotor shaft with one axial end fixably connected to a spinning rotor and an opposite axial end having a recess,
   a support ball formed separately of said rotor shaft and disposed in said recess and projecting axially out of said recess to form a radially extending supporting surface,
   and a vibrating supporting ball of a step bearing engaging said supporting surface of the support ball.

13. An open end spinning rotor support assembly according to claim 12, wherein the supporting surface is made by removing material from the support ball.

14. An open end spinning rotor support assembly according to claim 13, wherein the support ball is made of a harder material than the material of at least one of the vibrating ball and the rotor shaft.

15. An open end spinning rotor support assembly according to claim 14, wherein the recess comprises a stopping face for axially fixing the support ball.

16. An open end spinning rotor support assembly according to claim 15, wherein the recess comprises a hollow conical section, whose circumferential surface forms the stopping face.

17. An open end spinning rotor support assembly according to claim 16, wherein the support ball is held in the recess by a press fit.

18. An open end spinning rotor support assembly according to claim 17, wherein the shaft is hardened at least in the area adjacent to the recess.

19. A method of making a rotor shaft for an open end spinning rotor having a first end which in use supports a spinning rotor and an opposite second end, said method comprising:
   providing a cylindrical shaft, hardening the cylindrical shaft at a second end region thereof,
   drilling an axially aligned bore into the second end of the shaft,
   subsequently inserting a substantially ball shaped ceramic supporting element in the bore drilled in the shaft and fixing the supporting element in said bore to the shaft, and subsequently machining a substantially plane supporting surface extending radially of the shaft on said ball shaped supporting element at the side thereof facing away from the shaft and spaced a small distance from the axial second end of the shaft.

20. A method of making a rotor shaft for an open end spinning rotor according to claim 19, wherein said machining includes grinding the supporting surface on the ball shaped ceramic element.

21. A method according to claim 19, wherein said drilling an axially aligned bore includes drilling a stepped bore with a first cylindrical end section open to the second end of the shaft, a second cylindrical section, and a conical section connecting the first and second cylindrical sections, said drilling being performed by a single drill bit forming the sections, and wherein said ball shaped ceramic element is press fit into said first cylindrical section to a position axially supported at the conical section, with the second cylindrical section forming a free open space adjacent a center section of the ball shaped element.

22. A shaft for an open-end spinning rotor having a free end provided with a supporting element for a vibrating supporting ball of a step bearing, said supporting element having the form of a support ball which is pressed into the free end of the shaft and which has a plane supporting surface which is engageable in use with the vibrating supporting ball.

23. A shaft according to claim 22, wherein the supporting surface is made by removing material from the support ball.

24. A shaft according to claim 23, wherein the support ball is made of a ceramic material.

25. A shaft according to claim 24, wherein the recess comprises a stopping face for axially fixing the support ball.

26. A shaft according to claim 25, wherein the recess comprises a hollow conical section, whose circumferential surface forms the stopping face.

27. A shaft according to claim 25, wherein the support ball is held in the recess by a press fit.

28. A shaft according to claim 25, wherein the shaft is hardened at least in the area adjacent to the recess.

29. A shaft according to claim 24, wherein the support ball is held in the recess by a press fit.

30. A shaft according to claim 24, wherein the shaft is hardened at least in the area adjacent to the recess.

31. A shaft according to claim 30, wherein the removal of material takes place by means of grinding the supporting surface of the support ball which has been pressed into place.

32. A shaft according to claim 22, wherein the support ball is made of a ceramic material.

33. A shaft according to claim 22, wherein the recess comprises a stopping face for axially fixing the support ball.

34. A shaft according to claim 33, wherein the recess comprises a hollow conical section, whose circumferential surface forms the stopping face.

35. A shaft according to claim 34, wherein the support ball is held in the recess by a press fit.

36. A shaft according to claim 34, wherein the shaft is hardened at least in the area adjacent to the recess.

37. A shaft according to claim 22, wherein the support ball is held in the recess by a press fit.

38. A shaft according to claim 37, wherein the shaft is hardened at least in the area adjacent to the recess.

39. A shaft according to claim 22, wherein the shaft is hardened at least in the area adjacent to the recess.

40. A shaft for an open-end spinning rotor having a first end designed to be connected to said spinning rotor and a second end designed to be supported by a step bearing, wherein the second end of the shaft has a recess, and wherein a support ball formed separately of said rotor shaft is disposed and fixed in said recess, said support ball having a surface extending radially of the rotor shaft for engaging with a vibrating supporting ball of said step bearing.

41. A shaft for an open-end spinning rotor according to claim 40, wherein said support ball is supported in the shaft so as to rest against a conical contact surface adjoining a cylindrical bore at the second end of the shaft.

42. A shaft for an open-end spinning-rotor according to claim 41, wherein the supporting surface is formed following insertion of the ball shaped supporting element in the shaft by grinding away material of the support ball.

43. A shaft for an open-end spinning rotor according to claim 40, wherein the supporting surface is disposed maximally less than 1 mm from the axial end of the shaft.

44. A shaft for an open-end spinning rotor according to claim 40, wherein the recess includes:

a stepped bore with a first cylindrical section having a diameter substantially equal to the diameter of the support ball, a second cylindrical section, and a conical section joining said first and second cylindrical section, said first cylindrical section engaging the support ball when in an in use position, while said second cylindrical section forms a free space behind a central portion of said support ball and said conical section forms an axial stop surface for the support ball.

45. A shaft for an open-end spinning rotor according to claim 44, wherein said second cylindrical section has a diameter approximately half the diameter of the first cylindrical section, and the conical section extends at an angle of between 35° and 45° through a central axis of the shaft and bore.

46. A shaft for an open-end spinning rotor according to claim 45, wherein said angle is approximately 40°.

47. A shaft for an open-end spinning rotor according to claim 46, wherein said second cylindrical section has an axial end in the shape of a cone formed by a drill forming the bore.

48. A shaft for an open-end spinning rotor according to claim 44, wherein the second cylindrical section is longer than the radius of the ball shaped element.

49. A shaft according to claim 40, wherein said supporting surface is made by removing material from the support ball after the support ball has been disposed and fixed in the recess of the rotor shaft.

50. A shaft according to claim 40, wherein said support ball is formed of ceramic material.

51. An open end spinning rotor shaft assembly comprising:

a rotor shaft with one axial end fixably connectable to a spinning rotor and an opposite axial end having a recess, and a support ball formed separately of said rotor shaft and disposed in and fixed in said recess, said support ball having a radially extending supporting surface adapted to engage a vibrating supporting ball of a step bearing when in an in use position on a rotor spinning machine.

* * * * *